(12) United States Patent
Templeton-Steadman et al.

(10) Patent No.: US 9,842,143 B2
(45) Date of Patent: *Dec. 12, 2017

(54) INFORMATION DELIVERY SYSTEM AND METHOD FOR MOBILE APPLIANCES

(75) Inventors: William J. Templeton-Steadman, Hemel Hempstead (GB); Roland E. Williams, Martinez, CA (US)

(73) Assignee: ZI CORPORATION OF CANADA, INC., Calgary, Alberta (CA)

( * ) Notice: Subject to any disclaimer, the term of this patent is extended or adjusted under 35 U.S.C. 154(b) by 1074 days.

This patent is subject to a terminal disclaimer.

(21) Appl. No.: 11/562,054

(22) Filed: Nov. 21, 2006

(65) Prior Publication Data

US 2007/0203879 A1 Aug. 30, 2007

Related U.S. Application Data

(60) Provisional application No. 60/738,513, filed on Nov. 21, 2005.

(51) Int. Cl.
*G06F 21/00* (2013.01)
*G06F 17/30* (2006.01)
*G06F 3/0482* (2013.01)
*G06F 3/0489* (2013.01)

(52) U.S. Cl.
CPC ...... *G06F 17/30528* (2013.01); *G06F 3/0482* (2013.01); *G06F 3/04892* (2013.01); *G06F 17/30943* (2013.01)

(58) Field of Classification Search
CPC ............................. G06F 17/30; G06Q 21/10

USPC .......................................................... 705/51
See application file for complete search history.

(56) References Cited

U.S. PATENT DOCUMENTS

| 5,331,315 | A | * | 7/1994 | Crosette | 340/825.02 |
| 6,625,457 | B1 | * | 9/2003 | Raith | 455/456.1 |
| 7,376,584 | B1 | * | 5/2008 | Weixel | 705/17 |
| 7,426,206 | B1 | * | 9/2008 | Ofek et al. | 370/389 |
| 8,972,444 | B2 | * | 3/2015 | Baluja et al. | 707/771 |
| 2002/0160766 | A1 | | 10/2002 | Portman et al. | |
| 2003/0012360 | A1 | * | 1/2003 | Kim | 379/355.01 |
| 2003/0023420 | A1 | | 1/2003 | Goodman | |
| 2003/0030666 | A1 | * | 2/2003 | Najmi et al. | 345/745 |
| 2003/0038735 | A1 | * | 2/2003 | Blumberg | 341/22 |
| 2003/0067495 | A1 | * | 4/2003 | Pu et al. | 345/811 |
| 2004/0043758 | A1 | * | 3/2004 | Sorvari et al. | 455/414.1 |
| 2004/0153963 | A1 | | 8/2004 | Simpson et al. | |
| 2004/0153975 | A1 | | 8/2004 | Williams et al. | |

(Continued)

FOREIGN PATENT DOCUMENTS

| JP | 2002-055899 | 2/2002 |
| JP | 2003-131979 | 5/2003 |

(Continued)

*Primary Examiner* — Alexis Casey
(74) *Attorney, Agent, or Firm* — Perkins Coie LLP (57) ABSTRACT

Information delivery systems and methods are disclosed. In a system according to the invention, there is a database system, a user appliance, a first communication channel and a second communication channel. The database system may have records that are alterable by a service provider. The user appliance may have an input device with polysemous keys. Further, the user appliance may also have a monitor, which is able to provide the user with information corresponding to records of the database system.

20 Claims, 3 Drawing Sheets

(56) References Cited

U.S. PATENT DOCUMENTS

| | | |
|---|---|---|
| 2004/0193603 A1 | 9/2004 | Ljubicich |
| 2005/0091184 A1 | 4/2005 | Seshadri et al. |
| 2005/0162395 A1 | 7/2005 | Unruh |
| 2005/0283725 A1* | 12/2005 | Griffin et al. ............... 715/532 |
| 2006/0058995 A1* | 3/2006 | Fux et al. ........................ 704/9 |
| 2006/0101347 A1* | 5/2006 | Runov et al. ............... 715/764 |
| 2006/0230350 A1* | 10/2006 | Baluja ........................ 715/700 |
| 2007/0206609 A1* | 9/2007 | Peisa et al. .................. 370/400 |

FOREIGN PATENT DOCUMENTS

| | | |
|---|---|---|
| JP | 2004-318463 | 11/2004 |
| WO | 03/044649 A2 | 5/2003 |
| WO | 2004111871 A1 | 12/2004 |
| WO | WO 2007005945 A2 * | 1/2007 |

* cited by examiner

INFORMATION DELIVERY SYSTEM AND METHOD FOR MOBILE APPLIANCES

CROSS-REFERENCE TO RELATED APPLICATION

This application claims the benefit of priority to U.S. provisional patent application Ser. No. 60/738,513, filed on Nov. 21, 2005.

FIELD OF THE INVENTION

The present invention relates to the delivery of information via a mobile appliance.

BACKGROUND OF THE INVENTION

The use of mobile appliances to interact with an internet by way of a session that mimics the experience of a user at a desktop is well known. A session is initiated by establishing a connection and invoking an application such as a browser through which all interaction is routed. Because bandwidth is limited in a busy mobile environment, data throughput can be slow and when added to the constraints imposed by a relatively small display area, the overall performance can be unsatisfactory. Improvements in the various technologies which aid in the processing of data for a desktop device have resulted in the user seeing the parent application screen almost instantaneously and this adds to the awareness that the mobile appliance system response is generally sluggish. The rapid refresh rates experienced by a desktop user are simply not common in a busy mobile network.

When using a mobile appliance, the user may need to move from the parent screen to other screens before locating the desired information. Displaying those screens can be time consuming. Further, the user may not know how to find the desired information efficiently, and it may be necessary to return to screens, including the parent screen, that the user has already viewed. Coupled with the lethargic transaction rate of mobile appliances, the process of finding desired information can be frustrating. Since charges for using a mobile appliance are often based on connection times rather than data volume, network latency imposes a substantial penalty on the user. The resulting user-dissatisfaction depresses use-rates and results in complaints to the service provider. This then further devalues the service and inhibits growth.

In the early days of cellular telephony, call set-up was done manually by placing a call to a mobile operator who would place the requested call and then call back the originating mobile appliance. Early automatic systems were simple and network performance was inhibited to the point where waiting times, during which the channel was held, were intolerable. Charges which accrued based on connection time resulted in outcry from users. Temporary solutions involved mirroring the mobile operator actions with off-air call set-up. This then freed up the channel during the holding or idle waiting time for use by other customers. A partial resolution was achieved by setting up the call at the same time that a voice channel was being assigned. At about the same time, network equipment was reaching more acceptable speeds of operation.

This operational latency problem resembles the inconveniences experienced by existing mobile data users, and so if a solution that resembled off-air call set-up could be developed, the latency and of course the lost holding time in the case of a dedicated channel application, could be greatly improved. However, solutions resembling the voice case above are not practical because server latencies are not within the control or even influence of the service provider.

In addition to the operational latency problem, user difficulties stemming from a complicated menu structure for mobile appliances have prevented users from making full use of their mobile appliances. As evidence of the complexity, most user manuals now occupy more volume than the product they describe, and are often difficult or time consuming to understand. Furthermore, with the exception of normal telephone function and text messaging, users are disinclined to experiment with their communications devices for fear of incurring large unexpected charges or somehow damaging or incapacitating the device. Consequently, service providers find it difficult to deliver a broad range of services because of the user's unwillingness to spend time to learn how to use the various features of their appliance. Because the service provider relies heavily on the ability to sell services in its business, the desire for a very simple user-interaction-system such as a menu-free interface is high.

Graphical interfaces go a long way to solving this problem but a user is often required to switch operating modes in order to switch between applications. Though less of a hurdle, such switching is not user-friendly and leads to confusion.

SUMMARY OF THE INVENTION

The invention may be embodied as an information delivery system having a database system, a user appliance, a first communication channel and a second communication channel. The database system may have records that are alterable by a service provider.

The user appliance may have an input device. The input device may have polysemous keys that may be used to represent more than one symbol, such as a character, so as to allow a user to indicate more than one word via a single sequence of key presses. As another example, the symbols represented by a particular polysemous key may be strokes of a character, so as to allow a user to indicate more than one character via a single sequence of key presses.

Further, the user appliance may also have a monitor. The monitor may be able to provide the user with information corresponding to records of the database system.

The first communication channel may link the user appliance with the database system in order to provide a sequence of key presses indicated by the user to the database system. The second communication channel may link the user appliance with the database system in order to provide to the user appliance information corresponding to at least one record of the database system. It will be recognized that the first communication channel and the second communication channel differ in the direction in which information flows, and as such both channels may be provided in a serial communication system using the same signal frequency. Alternatively, for example, in a parallel communication system each channel may be given its own frequency.

In a method according to the invention, an information delivery system, like that described above, may be provided. Keys on the input device may be pressed to provide a sequence of key presses. The sequence of key presses may be provided to the first communication channel. At least one of the records in the database system that corresponds to the sequence may be identified. Information corresponding to the identified record may then be provided via the second communication channel to the user appliance.

BRIEF DESCRIPTION OF THE DRAWINGS

For a fuller understanding of the nature and objects of the invention, reference should be made to the accompanying drawings and the subsequent description. Briefly, the drawings are.

FURTHER DESCRIPTION OF THE INVENTION

A keypad oriented solution is described below. Instead of the default function of the appliance being either a graphical or numerical one, an embodiment of the present invention makes the default screen a text based one.

Figure 1:
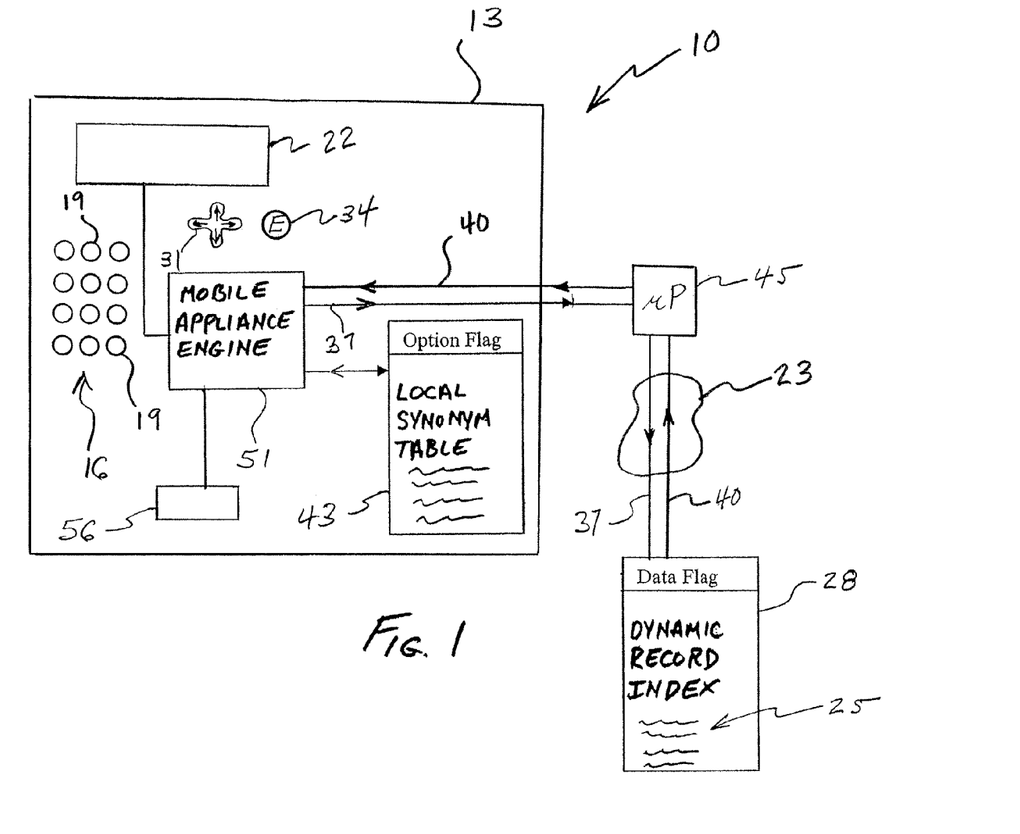
FIG. 1, which is a schematic representation of an information delivery system according to the invention.

An information delivery system 10 according to the invention has a user appliance 13, which may include a cellular telephone. The user appliance 13 may have an input device 16, such as a standard 12-button key pad found on many telephones. Such an input device 16 allows a user to indicate more than one word via a single sequence of key presses because some of the keys 19 on the key pad may be used to represent more than one symbol, such as a letter, number, or portion of a character, such as a stroke made as part of drawing a character.

The invention is not limited to a standard 12-button key pad. Other types of input devices 16 may be used. For example, gesturing devices and eye-gaze detectors may be suitable input devices 16 for this invention. In these input devices 16, the keys 19 may be virtual keys, which are displayed on the monitor 22. A virtual key may be selected by a virtual key press, such as by moving a cursor to a desired one of the virtual keys and selecting that desired virtual key in order to indicate the virtual key desired by the user.

The user appliance 13 may also have a monitor 22, such as an LCD display monitor. The monitor 22 may be able to provide the user with information corresponding to records 25 of the database system 28. A selection device 31 may be used in conjunction with the monitor 22 in order to identify items displayed on the monitor 22. Such a selection device 31 may be arrow keys, which control a cursor on the monitor 22. By pressing the arrow keys, the cursor may be made to move on the monitor 22 until a desired item displayed on the monitor 22 is highlighted. Once highlighted, an "enter" key 34 may be pressed in order to indicate the user's desired selection.

The user appliance 13 may communicate via a computer network 23 to a database system 28 using communication channels 37, 40, one for sending information to the network 23 and one for receiving information from the network 23. As noted above, a single frequency may be used to provide the channels 37, 40, for example where serial communication is acceptable. The database system 28 may have records 25 that are alterable by a service provider.

In such an environment, the user enters, via the input device 16, the symbol representation of what is desired and the user appliance 13 determines the best or most likely contextual action. For example, entering the key sequence '226' on the keypad of a standard telephone may correspond to the literal entry of a telephone number beginning '226', or it may correspond to a previously used or stored number containing the sequence '226', or it may correspond to a word which uses some combination of the letters and numbers marked on the keys 19.

In a standard telephone keypad, the key 19 with the number "2" also has the letters "A", "B" and "C". Further, the key 19 with the number "6" also has the letters "M", "N" and "O". So the sequence "226" may also indicate the user's desire to indicate "CAMera" or "BANners" or "A26", any of which might lead to an application or annotated entry locally on the appliance. In this document, "word" is sometimes used to indicate a sequence of symbols that identifies something. In the case of a telephone number, the "word" might be 226-8935. In the case of letters, the "word" might be "camera" or "banners". It should be noted that some "words" may be comprised of both numbers and letters, such as "A26".

Further, it should be noted that the present invention is not limited to polysemous keys 19 for the English language. For example, the symbols represented by a polysemous key 19 may be strokes that make up a character of the Japanese language. In this situation, the "word" is a sequence of strokes that a person might make in order to draw a character of the Japanese language, such as the character 汽, which means "steam".

Local tables of an appliance may be utilized in a system 10 according to the invention. Existing mobile appliances maintain local tables 43 that include a user synonym data set. The local table 43 may be programmed by a user and may be thought of as a computer shortcut whereby a user enters only a short key sequence and the resulting entry points to a much longer sequence which may or may not include the keys 19 that were pressed by the user. Typical of this are short names that access url (uniform resource locator) addresses; in this case a single word might be the shortcut for a group of four numeric strings with text prefixes or suffixes. In addition to literal indexing, a synonym table 43 may allow cross indexing. So, for example, pressing the keys 19 corresponding to "746" could be used to indicate the user's desire to indicate "PHOto", and in response, a monitor 22 of the appliance 13 may display "CAMERA" as a possible application which the user may select.

An information delivery system 10 according to the invention may include a database system 28 having records 25. This database system 28 is frequently referred to herein as a "dynamic record index". The dynamic record index 28 may be used in conjunction with the literal indexing and synonym tables 43 currently employed on some appliances. Unlike literal indexing and synonym tables 43, which are local to the appliance and those particular indexing entries which are dedicated at the time of sale to the customer, the dynamic record index 28 need not be located on the appliance, and may be modified from a place other than the appliance. The dynamic record index 28 is not necessarily limited in size, but practical constraints, such as limited available memory may prevent very large implementations.

In the case where a service provider wishes to expand or alter a service offering, this may be achieved by allowing the service provider to populate the dynamic record index 28. The user appliance 13 may provide to the user via the monitor 22 the usual locally generated options in response to the user pressing a sequence of keys 19, as well as additional material from the dynamic record index 28. By way of example, suppose that the operator wishes to provide information regarding a business offering by way of an added value service to the user. Using data available to the service provider, a record 25 may be made in the dynamic record index 28 so that when the user next searches for information in a particular set, information such as a business offering corresponding to the record is displayed to the user. For example, if the user enters a key sequence that may be interpreted as "TRA", in addition to the usual bookmark entries available to the user, the operator may have made available a special offer for train services that day as well. Supplementary synonyms may be one-time or persistent entries. As a further example if the user enters a key sequence that may be interpreted as "SPE", a daily special offer may be provided to the user.

A mobile appliance, such as a cellular telephone, may have associated with it not only the address data of the appliance itself, but two other elements that are often found in a mobile communication network. These are Network Time and also the approximate regional location of the appliance. In many communication networks for mobile appliances, the communication link between the appliance 13 and the communication network is accomplished via a base station, for example a cell-tower, having receivers and transmitters that receive and send signals to the appliance. The base station serves to send signals from the appliance 13 that are intended for the communication network, and also serves to receive signals from the communication network that are intended for the appliance 13. By knowing which base station is being utilized by an appliance 13, the local time and approximate location of the appliance 13 may be determined. Alternatively, the appliance 13 may include a global positioning system and a clock, and be equipped to send a periodic signal to the communication network informing the communication network of the local time and location of the appliance 13.

From the local time and approximate location information, the service provider may be able to determine which records 25 in the dynamic record index 28 make the most sense for the user. Consequently, an information delivery system 10 according to the invention may include a microprocessor 45 programmed to determine a time of day corresponding to the user appliance 13, and programmed to determine, based on the time of day, whether the at least one record 25 of the database system 28 should be provided to the communication channel 40 or the monitor 22.

Alternatively, or in addition, the information delivery system 10 may include a microprocessor 45 programmed to determine a location of the user appliance 13, and programmed to determine, based on the location, whether a record 25 of the database system 28 should be provided to the communication channel 40 or the monitor 22. As a result, it may be possible to accommodate a user based in San Francisco but currently traveling in the United Kingdom by preventing the user from being provided with an Amtrak special offer valid for 24 hours, but instead being provided with information about a weekend special from London to Edinburgh. By knowing where the user is, the dynamic record index 28 may be populated with records 25 that may be more desirable to the user. Similarly, a user request "466" might point to "GOOd pub", but unless the suggested establishment were within a convenient radius, this would be quite useless, and so a system 10 according to the invention may provide a list of pubs in the vicinity of the appliance 13, and exclude from the list those pubs not in the vicinity of the user appliance 13. One manner of identifying pubs that are within a convenient radius of the mobile appliance 13 would be to determine whether a base station being used by the appliance 13 is also a base station that might serve a particular pub. If the base station associated with a particular pub and the base station of the appliance 13 are the same, or within some specified distance, then that pub would be added to the dynamic record index 28.

The service provider may consider user location and/or the time of day to determine which regional data and/or national data records 25 should be placed in the dynamic record index 28 corresponding to a particular user or group of users. Records 25 in the database system 28 may have associated with them a flag that identifies the record 25 as a national, regional or local record 25. Each record 25 may have associated with it a validity period which is also flagged. These flags may be used to determine the information that should or should not be presented to the user and to erase expired records 25 from the dynamic record index 28.

When a user begins to enter a sequence by pressing the keys 19 of the appliance 13, matching records 25 from the dynamic record index 28, in addition to matching records generated locally from the appliance 13, may be displayed on a monitor 22 for selection by the user. Further, when a supplemental match is encountered, a pointer to this data may be stored in a reserved segment of the dynamic record index 28. So, if a user enters a key sequence which encounters a match of interest to the user but is not immediately accessed because of a more immediate task, it can be recalled by a later inquiry provided by the user to the appliance 13.

When a user selects an item provided from the dynamic record index 28, the appliance 13 may invoke a request to the service provider for more information. This can be done in several ways, but in one embodiment of the invention a browser session may provide an effective interface between the user and the information relating to the selected item. It will be clear to those skilled in the art that even relatively short message exchanges can be used to enable this function.

In FIG. 1 there is shown a mobile appliance engine 51 which is capable of receiving a word. The mobile appliance engine 51 may be a microprocessor 45 programmed to perform certain functions. The word may be provided by a sequence of key presses executed by a user of the input device 16. For example, the word may be made by pressing the keys 19 associated with "746" on the user's cellular telephone. The appliance engine 51 may interpret the word as a request for information. To obtain information that may be desired by the user, the engine 51 may access a local synonym table 43, where there may be stored pointers to information that the user previously desired when providing a particular sequence of key presses. For example, the local synonym table 43 might include pointers corresponding to the entry "746" which point to the CAMera function, which was recently used to take a photograph, or to a phone number beginning with the numbers 7, 4 and 6, which was recently dialed by the user, or to the word "sink", which was previously used in a text message sent by the user.

A flag in the local synonym table 43 may be used to indicate whether there are records 25 in the dynamic record index 28 corresponding to the sequence. So, if the entered sequence is "746" and the flag in the local synonym table 43 corresponding to "746" is set, the mobile appliance 13 may send a request to have information corresponding to records 25 from the dynamic record index 28 sent to the mobile appliance 13 for display to the user. In this manner, the user may be provided with a business opportunity to purchase a new RINg-tone for the user's cellular telephone, as well as a business opportunity to purchase tickets for the play SIMple Simon that is currently playing at a theater near the user's location. The information provided from the dynamic record index 28 may be provided along with information provided from the appliance's 13 memory, for example, the CAMera function, the phone number 746-9985, the word "sink" may be provided.

Additional flags corresponding to the local synonym table 43 may be set to indicate user preferences such as how information provided from the dynamic record index 28 should be ordered. For example, the user may prefer to see the order of information items from the dynamic record index 28 such that premium services, for which there is a fee, are placed toward the top of a list of information items. Or the user may prefer to see the information items corresponding to time-limited business offers toward the top of the list.

The mobile appliance 13 may include a storage device 56 that allows information pointed to by the dynamic record index 28 to be stored locally. Once information pointed to by the dynamic record index 28 is downloaded to the mobile appliance 13 and stored in the storage device 56, the mobile appliance 13 need not access the network 23 to obtain the information pointed to by the dynamic record index 28. Consequently, the user may more quickly access information pointed to by the dynamic record index 28.

Once an information item is downloaded from the dynamic record index 28 to the appliance 13, the downloaded item may be pointed to by the local synonym table 43, and thereby facilitate future use of that information. In this manner, the mobile appliance 13 need not download information from the dynamic record index 28 each time a particular sequence of keys 19 is entered by the user. If the flag in the local synonym table 43 indicates the time when the last download from the dynamic record index 28 occurred, then the mobile appliance engine 51 may compare the flag of the local synonym table 43 to determine whether additional information items are available for download from the dynamic record index 28, and if such items exist, then only those additional information items need be downloaded.

Information items that have been downloaded from the dynamic record index 28 and are pointed to by a local synonym table 43 may be flagged to expire. For example, such information items may be flagged to expire at a predetermined time, thereby allowing the local synonym table 43 to be modified by the appliance 13 without needing to access the dynamic record index 28. This may be particularly useful for information items that expire or are not useful after a particular time. Such flags may also indicate a need to remove or suppress a downloaded information item if the mobile appliance 13 is moved from one geographic location to another. In this manner, for example, the user will not be presented with the daily food specials at a London pub when the user is in San Francisco.

Figure 2:
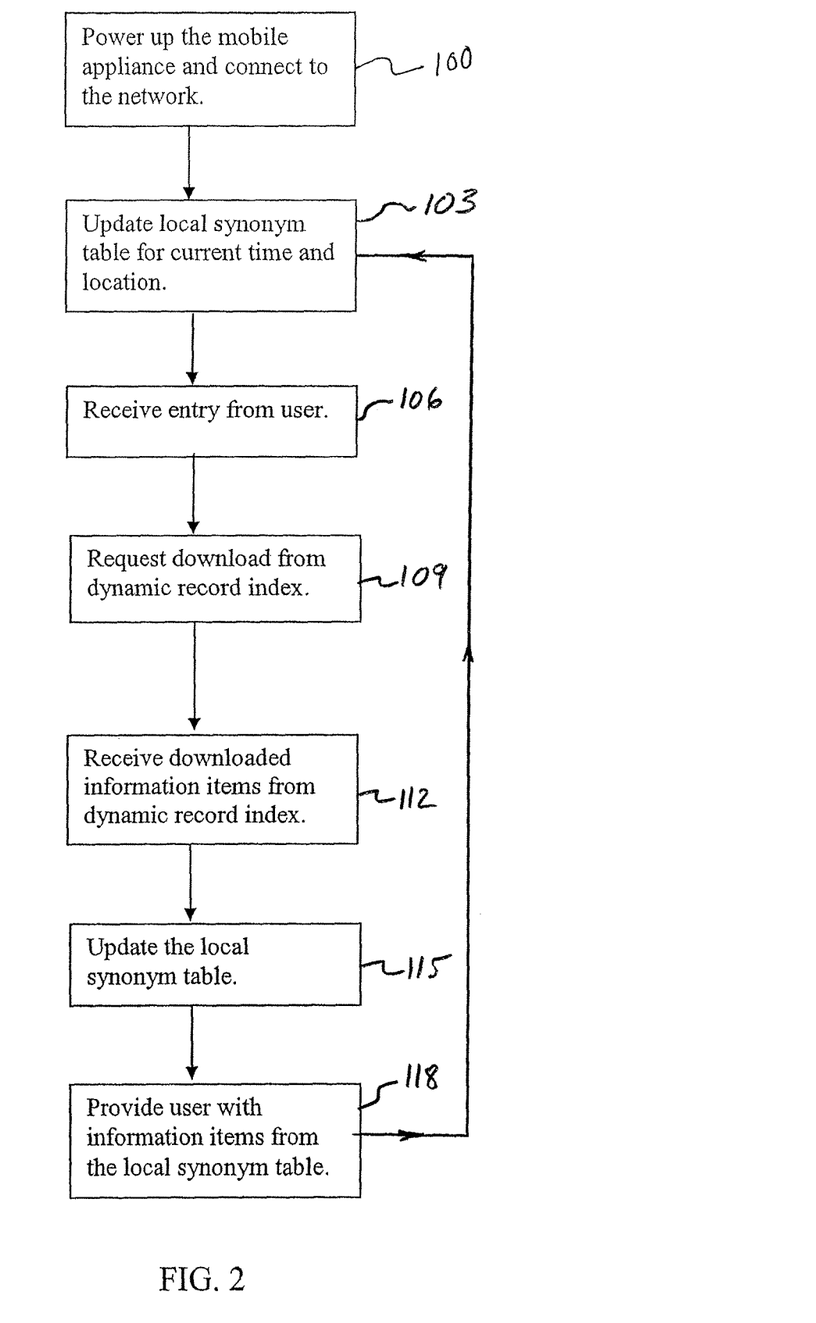
FIG. 2, which is a flow chart depicting a method according to the invention.

FIG. 2 depicts a method according to the invention in which the local synonym table 43 is updated to point to information items received from the dynamic record index 28 once the user provides a sequence of key presses. In this method, a mobile appliance 13 is turned on and communication between the appliance 13 and a network 23 is established 100, for example via communication channels 37, 40. The local synonym table 43 is updated 103 to reflect the time and location of the appliance 13. A user then presses a sequence of keys 19 so that an entry is received 106, and the appliance 13 then sends 109 on communication channel 37 a request to download from the dynamic record index 28. Records 25 corresponding to the request are identified in the database system 28. Information items corresponding to the identified records 25 are sent from the dynamic record index 28 and received 112 by the appliance 13. The local synonym table 43 is updated 115 to reflect the presence of the information sent from the dynamic record index 28, and the monitor 22 may be used to provide 118 the user with the information from the dynamic record index 28, as well as information items from the local synonym table 43.

Figure 3:
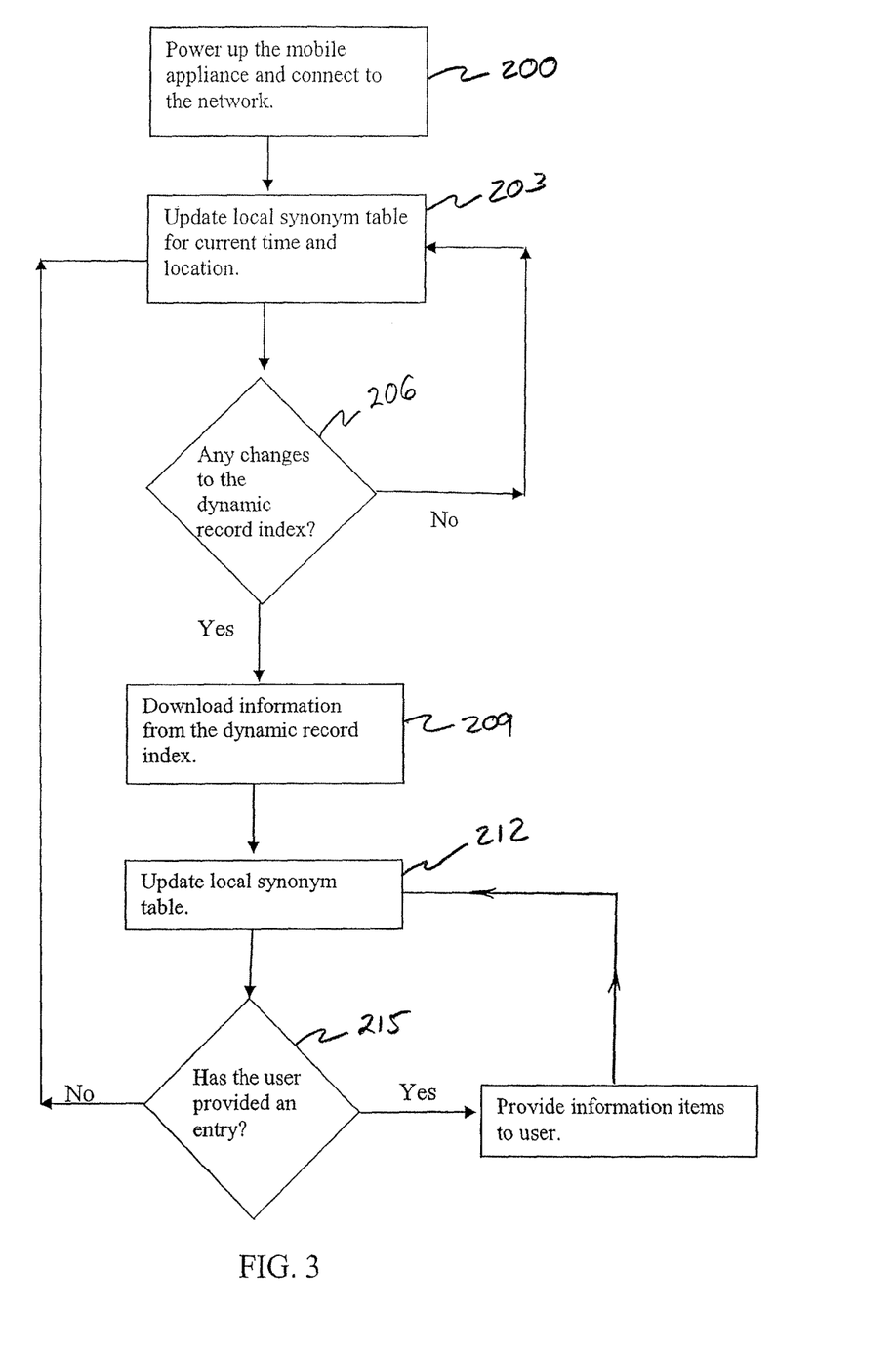
FIG. 3, which is a flow chart depicting a method according to the invention.

FIG. 3 depicts a method according to the invention in which the local synonym table 43 is updated periodically. In this method, a mobile appliance 13 is turned on and communication between the appliance 13 and a network 23 is established 200, for example via communication channels 37, 40. The local synonym table 43 is updated 203 to reflect the time and location of the appliance 13. The appliance 13 then sends a query 206 to determine whether there are any changes to the dynamic record index 28 applicable to the appliance 13. Information is downloaded 209 and the local synonym table 43 is then updated 212 to reflect changes to the dynamic record index 28. A user then presses 215 a sequence of keys 19, and if the sequence of key presses matches records 25 in the dynamic record index 28, the corresponding information items are provided 218 to the user, along with items from the local synonym table 43.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. A mobile appliance having a user associated therewith, the mobile appliance comprising:
   a microprocessor;
   a local synonym table including a local synonym data set that includes a plurality of stored records, wherein each of the stored records includes a sequence of symbols that is indexed to one or more corresponding words, characters, number sequences or letter/number sequences and further includes at least one flag indicating whether a remote database system has records corresponding to a particular sequence of user inputs
   a storage device associated with the microprocessor; and
   an input device in communication with the microprocessor, wherein the input device includes a plurality of polysemous keys, wherein each of the polysemous keys represents more than one symbol corresponding to any of a letter, a number, or a portion of a character;
   wherein the microprocessor includes instructions for performing a method comprising: responsive to a powering on of the mobile appliance automatically sending a wireless signal over a wireless communication channel to a base station of a plurality of base stations associated with a network, to initiate wireless communication over the network to establish local time and approximate location of the mobile appliance;
   wherein the approximate location is based on a location of the base station; and
   wherein the local time is based on any of
      a time provided by a clock included with the mobile appliance, or
      the location of the base station;
   automatically updating, by the microprocessor, the local synonym table to reflect the local time and approximate location of the mobile appliance, determining, by the microprocessor, one or more records are no longer useful, by comparing the local time and approximate location of the mobile appliance to predetermined criteria;

in response to determining the one or more records are longer useful, automatically removing the one or more records from the storage device;

sending, by the microprocessor, a query over the network to the remote database system with a dynamic record index alterable by a service provider, for information items that are applicable to the mobile appliance based on the local time and approximate location of the mobile appliance;

receiving, by the microprocessor, the information items over the network from the remote database system;

storing the received information items in the storage device;

further updating the local synonym table to point to the stored received information items in the storage device, including a sequence of symbols corresponding to each information item of the received and stored information items;

receiving a sequence of user inputs through the polysemous keys that indicate more than one word, character, number sequence, or letter/number sequence;

searching the further updated local synonym table to identify an information item that is stored in the storage device that corresponds to the received sequence of inputs;

based on the searching, retrieving the identified information item that corresponds to the received sequence of inputs from the storage device; and displaying the corresponding information item on a monitor for the user;

wherein the displayed corresponding information item applicable to the user, based on the local time and the approximate location of the mobile appliance.

2. The mobile appliance of claim 1, further comprising:
a selection device able to receive from the user a selection of the displayed corresponding information item.

3. The mobile appliance of claim 1, wherein the microprocessor includes instructions for:
determining, based on the local time, whether the query should be sent.

4. The mobile appliance of claim 1, wherein the microprocessor includes instructions for:
determining, based on the local time, whether the corresponding information item should be displayed on the monitor.

5. The mobile appliance of claim 1, wherein the microprocessor includes instructions for:
determining, based on the approximate location, whether the query should be sent.

6. The mobile appliance of claim 1, wherein the microprocessor includes instructions for:
determining, based on the approximate location, whether the corresponding information item should be displayed on the monitor.

7. The mobile appliance of claim 1, wherein the corresponding information item includes a flag, the flag indicating conditions under which the corresponding information item should be provided to the user.

8. The mobile appliance of claim 7, wherein the flag indicates a time during which the corresponding information item can be provided to the user.

9. The mobile appliance of claim 7, wherein the flag indicates a geographic area within which the corresponding information item can be provided to the user.

10. The mobile appliance of claim 1, wherein the corresponding information item includes a flag, the flag indicating conditions under which the corresponding information item should not be provided to the user.

11. The mobile appliance of claim 10, wherein the flag indicates a time after which the corresponding information item should not be provided to the user.

12. The mobile appliance of claim 1, wherein the corresponding information item includes a flag, the flag indicating conditions under which the corresponding information item should be removed or suppressed.

13. A mobile appliance of claim 1, wherein the local synonym table further includes checking the at least one flag, wherein the at least one flag indicates whether the remote database system has records corresponding to a particular sequence of user inputs.

14. A method of providing information to a user of a mobile appliance, the mobile appliance comprising a microprocessor, a local synonym table including a local synonym data set that includes a plurality of stored records, wherein each of the stored records includes a sequence of symbols that is indexed to one or more corresponding words, characters, number sequences or letter/number sequences and further includes at least one flag indicating whether a remote database system has records corresponding to a particular sequence of user inputs, a storage device associated with the microprocessor, and an input device in communication with the microprocessor, wherein the input device includes a plurality of polysemous keys, wherein each of the polysemous keys represents more than one symbol corresponding to any of a letter, a number, or a portion of a character, wherein the microprocessor includes instructions for performing the method comprising:

responsive to a powering on of the mobile appliance, automatically sending a wireless signal over a wireless communication channel to a base station of a plurality of base stations associated with a network, to initiate wireless communication over the network to establish local time and approximate location of the mobile appliance;

wherein the approximate location is based on a location of the base station; and wherein the local time is based on any of
a time provided by a clock included with the mobile appliance, or
the location of the base station;

automatically updating, by the microprocessor, the local synonym table to reflect the local time and the approximate location of the mobile appliance, determining, by the microprocessor, one or more records are no longer useful, by comparing the local time and approximate location of the mobile appliance to predetermined criteria;

in response to determining the one or more records are longer useful, automatically removing the one or more records from the storage device;

sending, by the microprocessor, a query over the network to the remote database system with a dynamic record index alterable by a service provider, for information items that are applicable to the mobile appliance based on the local time and the approximate location of the mobile appliance;

receiving by the microprocessor, the information items over the network from the remote database system;

storing the received information items in the storage device;

further updating the local synonym table to point to the stored received information items in the storage device, including a sequence of symbols corresponding to each information item of the received and stored information items;

receiving a sequence of user inputs through the polysemous keys that indicate more than one word, character, number sequence, or letter/number sequence;

searching the further updated local synonym table to identify an information item that is stored in the storage device that corresponds to the received sequence of inputs;

based on the searching, retrieving the identified information item that corresponds to the received sequence of inputs from the storage device; and displaying the corresponding information item on a monitor for the user; wherein the displayed corresponding information item applicable to the user, based on the local time and the approximate location of the mobile appliance.

15. The method of claim 14, wherein the microprocessor further performs operations including:

determining whether any of the information items indicate location information;

comparing the approximate location of the mobile appliance to the location information;

determining whether the approximate location of the mobile appliance is within an area identified by the location information; and removing or suppressing the corresponding information items if the approximate location of the mobile appliance is within an area other than the area identified by the location information.

16. The method of claim 14, wherein the microprocessor further performs operations including:

determining whether any of the information items indicate location information;

comparing the approximate location of the mobile appliance to the location information;

determining whether the approximate location of the mobile appliance is within an area identified by the location information; and displaying the corresponding information items to the user if the approximate location of the mobile appliance is within an area identified by the location information.

17. The method of claim 14, wherein the microprocessor further performs checking the at least one flag to determine whether the remote database system has a record corresponding to the sequence of user inputs.

18. The mobile appliance of claim 1, wherein the corresponding information item is flagged to expire at a predetermined time.

19. The mobile appliance of claim 1, wherein the query includes the sequence of user inputs.

20. The method of claim 14, wherein the corresponding information item is flagged to expire at a predetermined time.

* * * * *